US009329922B1

(12) United States Patent
McFarlane et al.

(10) Patent No.: US 9,329,922 B1
(45) Date of Patent: May 3, 2016

(54) DEFECT ANALYSIS BASED UPON HARDWARE STATE CHANGES

(71) Applicant: Amazon Technologies, Inc., Seattle, WA (US)

(72) Inventors: Joshua William McFarlane, Seattle, WA (US); Andrew Thomas Troutman, Seattle, WA (US); Matthew Roy Noble, Seattle, WA (US); Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 14/104,783

(22) Filed: Dec. 12, 2013

(51) Int. Cl.
*G06F 11/00* (2006.01)
*G06F 11/07* (2006.01)
*G06F 11/36* (2006.01)

(52) U.S. Cl.
CPC .......... *G06F 11/079* (2013.01); *G06F 11/3664* (2013.01); *G06F 11/3668* (2013.01)

(58) Field of Classification Search
CPC ... G06F 11/079; G06F 11/36; G06F 11/3664; G06F 11/3668; G06F 11/3055; G06F 8/71
See application file for complete search history.

(56) References Cited

U.S. PATENT DOCUMENTS

| 6,195,795 | B1* | 2/2001 | Block et al. | 717/101 |
| 6,701,519 | B1* | 3/2004 | Cowan | 717/130 |
| 8,650,552 | B1* | 2/2014 | Liao | 717/135 |
| 2009/0038010 | A1* | 2/2009 | Ma et al. | 726/23 |
| 2012/0079456 | A1* | 3/2012 | Kannan et al. | 717/124 |
| 2013/0041999 | A1* | 2/2013 | Cowham et al. | 709/224 |

OTHER PUBLICATIONS

Chacon, S. "Pro Git" published by Apress [online][retrieved on Dec. 12, 2013] retrieved from: http://martinez.io/git-distributed-even-if-your-workflow-isnt, 10 pps.

* cited by examiner

*Primary Examiner* — Philip Guyton
(74) *Attorney, Agent, or Firm* — Lee & Hayes, PLLC

(57) ABSTRACT

Technologies are described herein for performing a defect analysis on a software component based upon collected data that describes the operational state of hardware devices in an execution environment utilized to execute the software component at different points in time. The hardware state data is collected from the hardware devices in the execution environment at different points in time and stored in a version control system. A defect analysis may then be performed for an issue identified in the software component utilizing the hardware state data stored in the version control system. Based upon the results of the defect analysis, one or more actions may be taken such as, but not limited to, rolling the hardware or software configuration of one or more of the hardware devices in the execution environment back to a previous point in time.

24 Claims, 4 Drawing Sheets

DEFECT ANALYSIS BASED UPON HARDWARE STATE CHANGES

BACKGROUND

Software components are frequently executed in complex execution environments that include many different hardware components. For example, an execution environment might include not only the actual computer systems upon which a software component executes, but also many other types of hardware components like load balancers, routers, network switches, and other types of hardware devices. The execution of the software component may be dependent upon the proper configuration and operation of these hardware devices.

In some cases, changes to the configuration of a hardware device in an execution environment may create an issue with the operation of a software component. For example, a software component may fail to execute properly following a change to the software or hardware configuration of a hardware device in the execution environment. In complex execution environments, the cause of these types of software issues can be difficult to identify. As a result, some system administrators have become hesitant to modify the configuration of hardware devices for fear of introducing a software issue for which the root cause may be difficult to identify and address.

It is with respect to these and other considerations that the disclosure made herein is presented.

DETAILED DESCRIPTION

Figure 1:
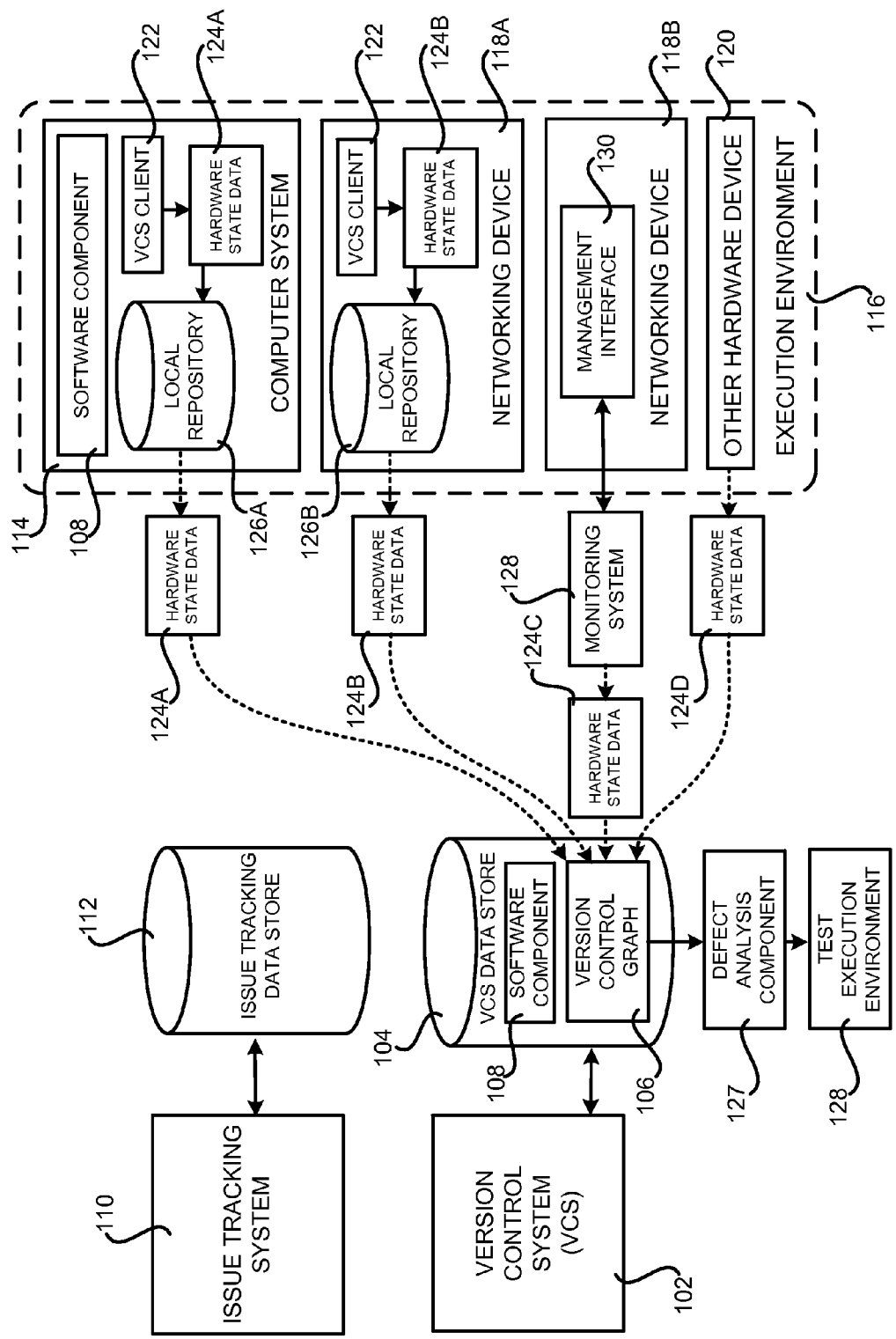
FIG. 1 is a system diagram showing aspects of a mechanism presented herein for performing a defect analysis for a software component based upon hardware state data, including several software and hardware components utilized in embodiments disclosed herein.

The following detailed description is directed to technologies for performing a defect analysis on an issue identified in a software component using data that describes the operational state of hardware devices in an execution environment utilized to execute the software component. By performing a defect analysis using hardware state data collected from hardware devices in an execution environment, the root cause of an issue in the software component caused in whole or in part by state changes to one or more hardware devices may be discovered. Additionally, one or more actions may be taken based upon the results of the defect analysis in order to resolve the issue with the software component.

According to one embodiment disclosed herein, an execution environment is utilized to execute a software component. The execution environment may include many different types of hardware devices such as computer systems utilized to execute the software component. The execution environment might also include other types of hardware devices upon which proper execution of the software component is directly or indirectly dependent. For example, and without limitation, the execution environment might include hardware network connectivity devices such as routers, switches, load balancers, and other types of hardware connectivity devices. The execution environment might also include other hardware devices upon which the proper execution of the software component is directly or indirectly dependent.

Some hardware devices in the execution environment may be configured with a version control system ("VCS") client application that is configured to collect hardware state data from the hardware device, and to provide the collected hardware state data to a VCS for storage in a version control graph. Hardware state data is data that describes the operational state of a hardware device at a particular point in time. For example, and without limitation, the hardware state data may encompass data defining the physical hardware configuration of a hardware device, data defining configuration settings utilized by a hardware device, and/or data defining aspects of the state of the operating environment of a hardware device. The hardware state data might also identify other aspects of the configuration and/or operational state of a hardware device.

A monitoring system is also provided in some embodiments for collecting hardware state data from hardware devices that are not configured with a VCS client. The monitoring system may utilize a management interface, or another type of interface, exposed by hardware devices in order to collect the hardware state data. The monitoring system may provide collected hardware state data to a VCS for storage in a version control graph maintained by the VCS. Monitoring and reporting by the VCS client application and the monitoring system may be performed at different points in time. In this way, data describing the operational state of the various hardware devices in an execution environment is collected at different points in time. Other mechanisms might also be utilized to collect hardware state data from hardware devices in an execution environment and to provide the collected data to a VCS.

In some embodiments, the hardware state data includes associated timing information that identifies the time at which the hardware state data was collected. The timing information may be utilized to rewrite the contents of a version control graph maintained by the VCS for storing the hardware state data. For example, a hardware device might provide hardware state data following the loss of power for a period of time. The timing information associated with this hardware state data may indicate the time at which power was lost and, potentially, the time at which the power to the device was restored. Because the hardware device would not be able to provide its hardware state data until after power was reapplied to the device, the hardware state data stored in the version control graph maintained by the VCS may be rewritten to reflect the actual time at which the state change occurred. In this way, a version control graph can be maintained that includes hardware state data for hardware devices in an execution environment in a sequential time-based order according to the time at which each state change occurred.

Hardware state data collected and stored at a VCS in the manner described above may be utilized to perform a defect analysis on a software component that executes in the execution environment. For example, an issue tracking system may be utilized to store data identifying resolved and unresolved issues with the software component. In order to perform a defect analysis for one of the issues identified in the issue tracking system, a test execution environment may be configured that includes some or all of the hardware devices in the execution environment upon which execution of the software component is directly or indirectly dependent. The hardware state data stored in the VCS may then be utilized to configure the hardware devices in the test execution environment. For example, and without limitation, the hardware state data stored in the VCS may be utilized to configure hardware devices in the test execution environment as they were configured in the execution environment at a point in time previous to when the issue with the software component was identified.

Once the test execution environment has been created and the hardware devices configured in the manner described above, execution of the software component may be tested in the test execution environment. A determination might also be made based upon the testing of the software component as to whether the identified issue with the software component is present in the test execution environment. If the issue is not present, an inference may be made that a change to the operational state of one or more of the hardware devices in the execution environment contributed to the issue with the software component.

One or more actions may then be taken to address the identified issue with the software component in the execution environment. For example, and without limitation, the configuration of one or more hardware devices in the execution environment may be rolled back to a previous point in time utilizing the hardware state data stored in the VCS. For example, configuration parameters for a hardware device collected at a previous point in time might be utilized to configure the device in the same manner as it was configured at the previous point in time. It should be appreciated that the defect analysis described above is merely illustrative and that other types of analyses may be performed using the hardware state data in the execution environment itself, in a test execution environment, or in another environment. Additional details regarding these and other aspects of the technologies presented herein will be described below with regard to FIGS. 1-3.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing aspects of a mechanism presented herein for defect analysis of a software component based upon hardware state data, including several software and hardware components utilized in embodiments disclosed herein. In one embodiment, a VCS 102 provides functionality for managing changes made to source code files and other types of files associated with a program (referred to herein as a "software component 108"). One specific example of a VCS 102 is the GIT open source distributed version control and source code management system. The VCS 102 may store the software component 108 in a VCS data store 104, which might also be referred to herein as a "source code repository." The VCS data store 104 might also be utilized to store a version control graph 106 that describes changes that have been made to the software component 108 maintained by the VCS 102. The VCS data store 104 might also be utilized to store other types of data and/or metadata regarding the creation and modification of a software component 108. As will be discussed in greater detail below, the VCS data store 104 might also be utilized to store data describing state changes associated with various hardware devices.

As shown in FIG. 1, the VCS 102 might also be utilized in conjunction with one or more other software development workflow systems, such as an issue tracking system 110. The issue tracking system 110 provides functionality for creating and managing entries (which might be referred to herein as "defect reports") for tracking issues that have been identified within a program being developed. For example, and without limitation, the issue tracking system 110 might maintain an issue tracking data store 112 for storing entries associated with issues that have been resolved in the software component 108 and entries associated with issues that currently exist in the software component 108. For example, and without limitation, the issue tracking data store 112 might be utilized to store data describing failed test cases associated with a resolved or unresolved issue in the software component 108, one or more stack traces associated with a resolved or unresolved issue in the software component 108, a human-generated text description of a resolved issue or an unresolved issue in the software component 108, and/or data identifying one or more conditions under which a resolved issue or an unresolved issue occurs in the software component 108. The issue tracking data store might also store data and/or metadata describing other characteristics of resolved issues and unresolved issues, respectively, in other embodiments.

As shown in FIG. 1, the software component 108 may be configured for execution in an execution environment 116. As discussed briefly above, the execution environment 116 may include many different types of hardware devices such as one or more computer systems 114 utilized to execute the software component 108. The execution environment 116 might also include other types of hardware devices upon which proper execution of the software component 108 is directly or indirectly dependent. For example, and without limitation, the execution environment 116 might include hardware networking devices 118A and 118B (which may be referred to herein individually as a "networking device 118" or collectively as the "networking devices 118"), such as routers, switches, load balancers, and other types of hardware connectivity devices. The execution environment 116 might also include other hardware devices 120 upon which the proper execution of the software component 108 is directly or indirectly dependent such as, but not limited to, power generation and distribution devices, cooling devices, and security devices.

Some hardware devices in the execution environment 116 may be configured with a VCS client application 122 (which may be referred to herein as a "VCS client") that is configured to collect hardware state data 124 from a hardware device, and to provide the collected hardware state data 124 to the VCS 102 for storage in the version control graph 106 in the VCS data store 104. For instance, in the example execution environment 116 shown in FIG. 1, the computer system 114 is equipped with a VCS client 122 configured to collect the hardware state data 124A, to store the hardware state data 124A in a local repository 126A, and to periodically provide the hardware state data 124A to the VCS 102. In the example execution environment 116 shown in FIG. 1, the networking device 118A is also equipped with a VCS client 122 configured to collect the hardware state data 124B, to store the hardware state data 124B in a local repository 126B, and to periodically provide the hardware state data 124B to the VCS 102.

As discussed briefly above, the hardware state data 124 is data that describes the operational state of a hardware device at a particular point in time. For example, and without limitation, the hardware state data 124 may encompass data defining the physical hardware configuration of a hardware device. For example, the hardware state data 124 might describe the hardware configuration of a hardware device. The hardware state data 124 might also indicate whether the hardware configuration has been changed since a previous point in time.

The hardware state data 124 may also encompass data defining configuration settings utilized by a hardware device and, potentially, any changes to the configuration settings since a previous point in time. For example, the hardware state data 124 might indicate the software configuration of a device and whether the software configuration has been changed. The hardware state data 124 might also encompass data defining the operating environmental for the hardware device and, potentially, any changes impacting the operation of a hardware device. For example, and without limitation, the hardware state data 124 might indicate that a hardware device was powered on or off, that a cable (e.g. a networking cable) was unplugged from a hardware device, or another type of change to the operating environment and/or connectivity of a hardware device.

The hardware state data 124 might also identify other intentional or unintentional changes to the configuration, connectivity, and/or operational state of a hardware device in the execution environment 116. As will be discussed in greater detail below, the hardware state data 124 may be utilized to configure hardware devices in a test execution environment 128 for use in defect testing of the software component 108 and for rolling back the configuration of hardware devices in the execution environment 116 to a previous point in time based upon results of the testing.

The hardware state data 124 might also indicate that operator action was taken on the device. For example, and without limitation, the hardware state data 124 might indicate that an operator began working on the hardware device at a particular point in time. The hardware state data 124 might similarly indicate that the operator stopped working on the hardware device at another point in time. This data may be collected in an automated fashion, for example, by detecting the opening and closing of a case containing components of the hardware device.

A monitoring system 128 is also provided in some embodiments for collecting hardware state data 124 from hardware devices in the execution environment 116 that are not configured with a VCS client 122. The monitoring system 128 may utilize a management interface, or another type of interface, exposed by hardware devices in order to collect the hardware state data. For instance, in the example execution environment 116 shown in FIG. 1, the networking device 118B is not equipped with a VCS client 122. In this case, the monitoring system 128 is configured to utilize the management interface 130 exposed by the networking device 118B to obtain the hardware state data 124C from the networking device 118B. The management interface 130 might be an Intelligent Platform Management Interface ("IPMI"), a Simple Network Management Protocol ("SNMP") interface, or another type of interface through which information regarding the operational state of a hardware device can be obtained.

The monitoring system 128 may also be configured to provide collected hardware state data 124 to the VCS 102 for storage in the version control graph 106 maintained by the VCS 102. In the example shown in FIG. 1, for instance, the monitoring system 128 is configured to obtain the hardware state data 124C from the networking device 118B by way of the management interface 130 and to provide the hardware state data 124C to the VCS 102.

The various instances of the VCS client 122 and the monitoring system 128 may be configured to obtain hardware state data 124 at regular time intervals. Based upon the differences between the hardware state data 124 at different points in time, a linear sequence of changes to the operational state of the various hardware devices in the execution environment 116 can be identified. Other mechanisms not specifically described herein might also be utilized to collect the hardware state data 124 from hardware devices in the execution environment 116 and to provide the collected hardware state data 124 to the VCS 102.

As mentioned briefly above, the hardware state data 124 includes associated timing information in some implementations that identifies the time at which the hardware state data 124 was collected. The hardware state data 124 might also indicate a time at which a change occurred to the state of a hardware device in the execution environment 116. As will be discussed in further detail below, the timing information may be utilized to retroactively rewrite the contents of the version control graph 106 maintained by the VCS 102 for storing the hardware state data 124. For example, a hardware device in the execution environment 116 might provide hardware state data 124 indicating that the hardware device lost power for a period of time. The timing information associated with this hardware state data 124 may indicate the time at which power was lost and, potentially, the time at which the power to the hardware device was restored. Because the hardware device would not be able to provide this hardware state data 124 until after power was restored to the hardware device, the hardware state data 124 stored in the version control graph 106 maintained by the VCS 102 may be rewritten to reflect the actual time at which the state change occurred. In this way, the version control graph 106 can be maintained that includes hardware state data 124 for hardware devices in the execution environment 116 organized in a linear time-based sequence according to the actual time at which the hardware state data 124 was collected.

It should be appreciated that, in some implementations, the version control graph 106 includes the collected hardware state data 124 and data describing a sequence of changes to the software component 108. In other embodiments, separate version control graphs 106 are utilized to store the hardware state data 124 and data reflecting changes to the software component 108. The same or different version control systems 102 might be utilized to store the different version control graphs 106. Other implementations might also be utilized. Additional details regarding the collection and storage of the hardware state data 124 will be provided below with regard to FIG. 2.

As also described briefly, the hardware state data 124 collected and stored at the VCS 102 may be utilized to perform a defect analysis for an issue identified within the software component 108. In this regard, and as discussed briefly above, the issue tracking system 110 may store data identifying one or more unresolved issues with the software component 108 in an issue tracking data store 112. A defect analysis component 127 may be configured to perform a defect analysis for one of the issues identified in the issue tracking system 110.

In order to perform a defect analysis, a test execution environment 128 is created in one embodiment. In particular, the test execution environment 128 may be configured with some or all of the hardware devices in the execution environment 116 upon which execution of the software component 108 is directly or indirectly dependent. For instance, in the example shown in FIG. 1, the test execution environment 128 might be configured with a computer system 108 for executing the software component 114, with networking devices like the networking devices 118A and 118B, and other hardware devices 120 upon which the execution of the software component 108 is dependent. The hardware devices in the test execution environment 116 might also be interconnected in a manner similar to the manner in which the devices are interconnected in the execution environment 116. In this way, a test execution environment 128 can be created that has a similar configuration of hardware devices as the execution environment 116.

Once the test execution environment 128 has been configured, the defect analysis component 127 may utilize the hardware state data 124 stored in the VCS 102 in order to configure the hardware devices in the test execution environment 128. For example, and without limitation, the defect analysis component 127 may utilize the hardware state data 124 stored in the VCS 102 in order to configure hardware devices in the test execution environment 128 in the same manner as the hardware devices in the execution environment 116 were configured at a point in time previous to when the issue with the software component 108 was identified. For instance, the defect analysis component 127 might utilize data stored in the VCS 102 to configure the software configuration of a computer system in the test execution environment 128 the same as the computer system 114 in the execution environment 116 was configured at a previous point in time. Similarly, the defect analysis component 127 might utilize data stored in the VCS 102 to configure a networking device in the test execution environment 128 the same as the networking device 118A was configured at a previous point in time. The defect analysis component 127 might also utilize data stored in the VCS 102 to configure other hardware devices in the test execution environment 128 in a similar fashion.

Once the test execution environment 128 has been created and the hardware devices contained therein have been configured in the manner described above, the defect analysis component 127 might test the execution of the software component 108 in the test execution environment 128. Based upon this testing, the defect analysis component 127 might make a determination as to whether the issue with the software component 108 is present in the test execution environment 128. If the issue is not present, the defect analysis component 127 may make an inference that a change to the operational state of one or more of the hardware devices in the execution environment 116 contributed to the issue with the software component 108. If the issue is still present in the software component 108 executing in the test execution environment 128, the defect analysis component 127 might roll the configuration of the hardware devices in the test execution environment 128 back to another point in time and repeat the testing of the software component 108. This process may repeat until no other previous configurations of hardware devices in the test execution environment 128 remain to be tested.

If the defect analysis component 127 determines that a change to the operational state of one or more of the hardware devices in the execution environment 116 contributed to the issue with the software component 108, the defect analysis component 127 might cause one or more actions to be taken to address the issue with the software component 108 in the execution environment 116. For example, and without limitation, the data stored in the VCS 102 may be utilized to roll back the software configuration of one or more hardware devices in the execution environment 116 to a previous point in time. The defect analysis component 127 might also provide an instruction to restore a hardware configuration or environment condition associated with a hardware device to a previous state in time. For example, and without limitation, an instruction might be provided to reconnect a network cable to a particular port on a network connectivity device. The defect analysis component 127 might also present information regarding the results of the defect analysis in an appropriate user interface, generate a trouble ticket, provide a notification to a system administrator or other personnel, trigger another type of analysis, or take another type of action.

It should be appreciated that the defect analysis described above is merely illustrative and that other types of analyses may be performed using the hardware state data 124 in the execution environment 116, in a test execution environment 128, or in another environment. Additional details regarding one type of defect analysis performed by the defect analysis component are provided below with regard to FIG. 3.

Figure 2:
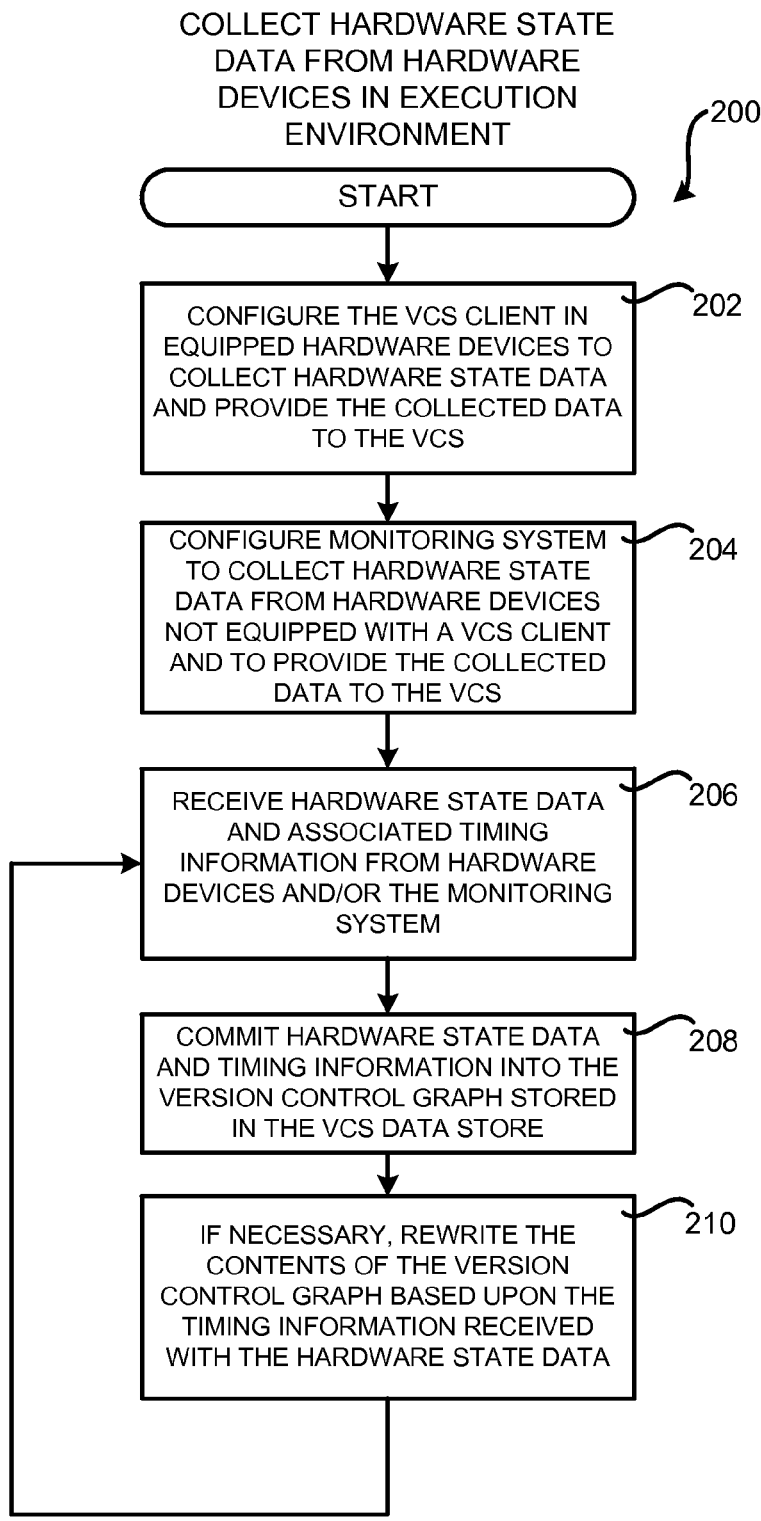
FIG. 2 is a flow diagram showing aspects of one illustrative routine disclosed herein for collecting hardware state data from hardware devices in an execution environment for a software component, according to embodiments described herein.

FIG. 2 is a flow diagram showing aspects of one illustrative routine 200 disclosed herein for collecting hardware state data 124 from hardware devices in an execution environment 116 for a software component 108, according to embodiments described herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where hardware devices in the execution environment 116 that are configured with a VCS client 122 are configured to collect hardware state data 124. The hardware devices are also configured to provide the hardware state data 124 to the VCS 102. As mentioned above, the VCS client 122 might store the hardware state data 124 in a local repository 126 on the respective hardware device prior to sending the hardware state data 124 to the VCS 102. The hardware state data 124 for multiple state changes might also be batched and collectively provided to the VCS 102. It should be appreciated that the hardware state data 124 may be "pushed" to the VCS 102 or that the VCS 102 may "pull" the hardware state data 124 from each device equipped with a VCS client 122. Other mechanisms might also be utilized to communicate the hardware state data 124 to the VCS 102 for storage in a version control graph 106.

From operation 202, the routine 200 proceeds to operation 204, where a monitoring system 128 might be configured to collect hardware state data 124 from hardware devices that are not equipped with a VCS client 122. The monitoring system 128 might also be configured to provide the collected hardware state data 124 to the VCS 102 for storage in a version control graph 106. Alternately, the VCS 102 might be configured to pull the hardware state data 124 from the monitoring system 128. As discussed above, the monitoring system 128 might utilize a management interface 130, or another type of interface, exposed by hardware devices in order to obtain the hardware state data 124. The monitoring system 128 might also utilize other mechanisms to obtain hardware state data 124 for a hardware device.

From operation 204, the routine 200 proceeds to operation 206, where the VCS 102 receives hardware state data 124 and associated timing information from the VCS clients 122 on suitably equipped hardware devices and/or from the monitoring system 128. The routine 200 then proceeds to operation 208, where the VCS 102 may commit the received data to a version control graph 106 stored in the VCS data store 104. As discussed above, the version control graph 106 might also contain data describing changes to the software component 108. Alternately, a separate version control graph 106 might be utilized to store data describing changes to the software component 108.

From operation 208, the routine 200 proceeds to operation 210, where the contents of the version control graph 106 may be rewritten based upon the timing information submitted with the hardware state data 124. As discussed briefly above, hardware devices in the execution environment 116 may be unable to report hardware state data 124 at or around the time an associated state change occurs. For example, a hardware device may be unable to report that electrical power to the device was lost until power is restored to the device. Similarly, hardware devices may be unable to report hardware state data 124 to the VCS 102 if a network connection is unavailable. Other conditions might also prevent hardware devices in the execution environment 116 from providing hardware state data 124 to the VCS 102 in a timely manner.

In order to account for the delay in receiving hardware state data 124 from a hardware device, the timing information received with hardware state data 124 may be utilized to rewrite the version control graph 106. In particular, the timing information may be utilized to adjust the contents of the version control graph 106 in order to maintain the time order of the hardware state changes defined by the version control graph 106. In this way, the version control graph 106 can be maintained in a manner such that it includes hardware state data 124 for hardware devices in the execution environment 116 in a linear time-based order according to the time at which the hardware state change data 124 was collected.

From operation 210, the routine 200 proceeds back to operation 206, where the VCS clients 122 and the monitoring system may continually provide hardware state data 124 to the VCS 102 for storage in the version control graph 106. The received hardware state data 124 may then be committed to the version control graph 106 and, potentially, the version control graph 106 may be reorganized based upon the received timing information. This process may be repeated indefinitely or as long as it is desirable to collect hardware state data 124 from hardware devices in the execution environment 116.

Figure 3:
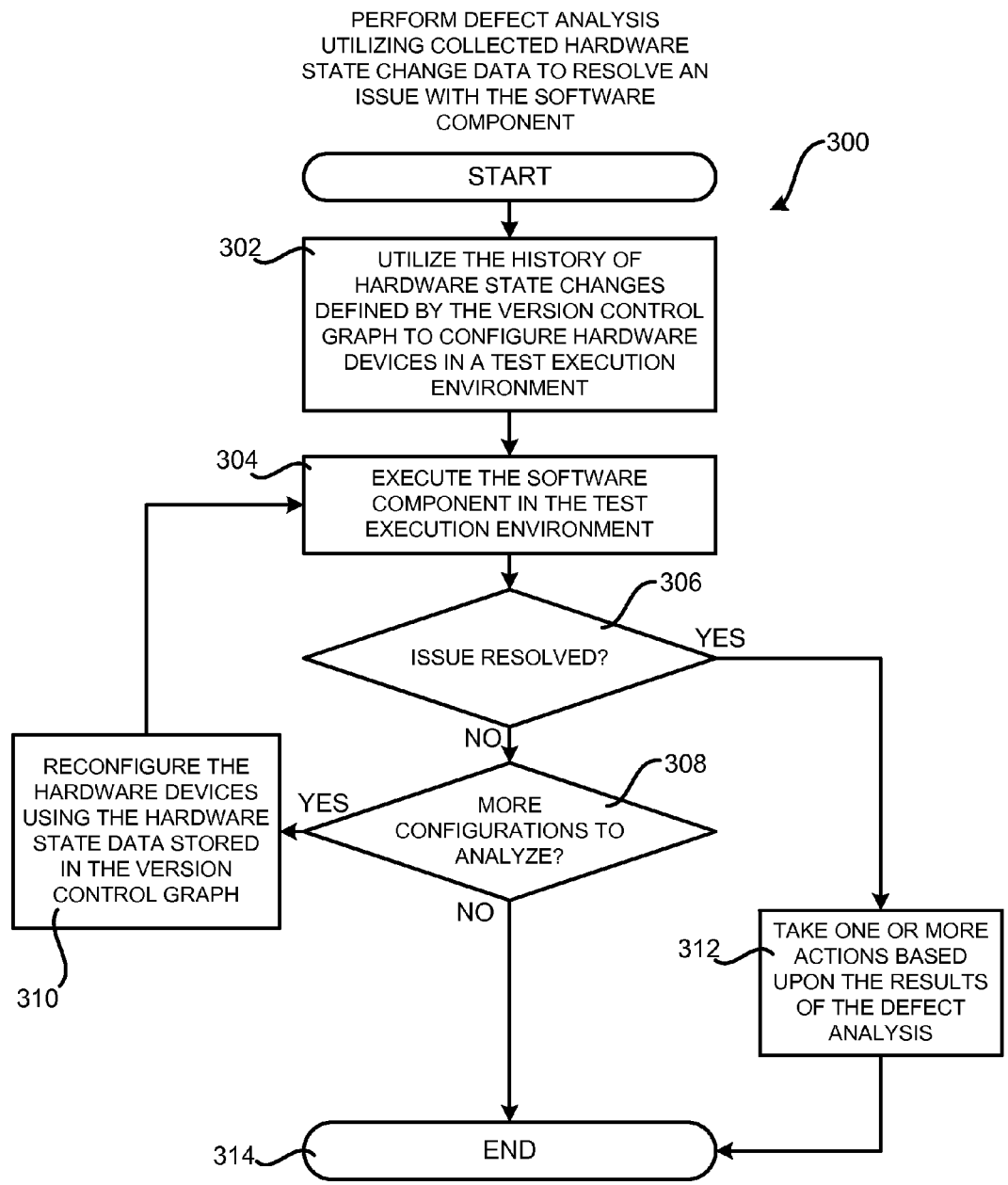
FIG. 3 is a flow diagram showing aspects of one illustrative routine disclosed herein for performing a defect analysis utilizing hardware state data collected from hardware devices in an execution environment for a software component, according to embodiments described herein.

FIG. 3 is a flow diagram showing aspects of one illustrative routine 300 disclosed herein for performing a defect analysis utilizing hardware state data 124 collected from hardware devices in an execution environment 116 for a software component 108, according to embodiments described herein. As briefly described above, the defect analysis component 127, or another component or collection of components, may implement the operations of the routine 300 in order to perform a defect analysis for an issue identified in the software component 108. In particular, the defect analysis described below may be utilized to determine whether a state change associated with a hardware device in the execution environment 116 contributed to the issue with the software component 108.

It should be appreciated that the defect analysis described below with respect to FIG. 3 is merely illustrative and that other types of defect analyses might also be performed utilizing a version control graph 106 storing hardware state data 124. For example, although the defect analysis described below is performed by executing the software component 108 in a test execution environment 128, other types of defect analyses may be performed in the execution environment 116 itself. Other types of defect analyses might also be performed using other types of environments and configurations of hardware devices.

The routine 300 begins at operation 302, where the history of hardware state changes defined by the version control graph 106 might be utilized to configure hardware devices in a test execution environment 128. For example, and as described briefly above, a text execution environment 128 might be created that includes hardware devices such as those contained in the execution environment 116 upon which execution of the software component 108 is directly or indirectly dependent. For example, and without limitation, the test execution environment 128 may be configured with computer systems 114 for executing the software component 108, with networking devices 118, and with other types of hardware devices 120.

Once the test execution environment 128 has been established, the hardware devices in the test execution environment 128 may be configured utilizing the hardware state data 124 stored in the version control graph 106. For example, and without limitation, the hardware devices in the test execution environment 128 may be configured as they were configured at a point in time previous to when the issue with the software component 108 was identified. By configuring the hardware devices in the test execution environment 128 in this manner, tests can be performed to determine whether a change in the state of a hardware device contributed to the issue with the software component 108.

From operation 302, the routine 300 proceeds to operation 304, where the software component 108 is executed in the test execution environment 128. A determination may then be made as to whether the issue with the software component 108 is still present. If the issue is not still present, an inference may be made that a state change associated with one or more of the hardware devices in the execution environment contributed to the identified issue with the software component 108. In this way, an issue with the software component 108 can be correlated with a state change for a hardware device in the execution environment 116. Accordingly, in this scenario, the routine 300 proceeds from operation 306 to operation 312, where one or more actions may be taken based upon the results of the defect analysis. For example, and without limitation, the configuration of one or more hardware devices in the execution environment 116 might be rolled back to a previous point in time. In this way, changes can be made to the configuration of hardware devices in the execution environment 116 in order to resolve the issue with the software component 108 executing in the execution environment 116. Other types of actions might also be taken based upon the results of the defect analysis. From operation 312, the routine 300 proceeds to operation 314, where it ends.

If, at operation 306, it is determined that the issue with the software component 108 was not resolved by rolling back the configuration of hardware devices in the test execution environment 128 to a previous point in time, the routine 300 proceeds from operation 306 to operation 308. At operation 308, the defect analysis component 127 determines whether the version control graph 106 contains data describing additional configurations to test. For example, the version control graph 106 might identify additional state changes to hardware devices in the execution environment 116. In this case, it may be desirable to roll the configuration of the hardware devices in the test execution environment 128 back to another point in time in order to determine the impact, if any, of these state changes on the execution of the software component 108.

If additional configurations of hardware devices remain to be analyzed, the routine 300 proceeds from operation 308 to operation 310. At operation 310, hardware devices in the test execution environment 128 are configured utilizing the hardware state data 124 stored in the version control graph 106. The routine 300 then returns back to operation 304, where execution of the software component 108 in the test execution environment 128 is again tested in view of the modifications to the configurations of the hardware devices in the test execution environment 128. If no additional configurations for the hardware devices in the test execution environment 128 remain to be tested, the routine 300 proceeds from operation 308 to operation 314, where it ends.

As discussed briefly above, one version control system 102 might be utilized to store a version control graph 106 identifying changes to the software component 108. Another version control system 102 might be utilized to store the hardware state data 124. In this implementation, the contents of the different version control graphs 106 may be merged in order to present a unified view of the changes made to the software component 108 and the hardware state data 124. For example, and without limitation, the version control graph 106 storing changes to the software component 108 and the version control graph 106 storing the hardware state data 124 may be retrieved. The two different version control graphs 106 may then be merged. The combined version control graph 106 might then be utilized to present a unified view of the changes to the software component 108 and the hardware state data 124 in an appropriate user interface.

Figure 4:
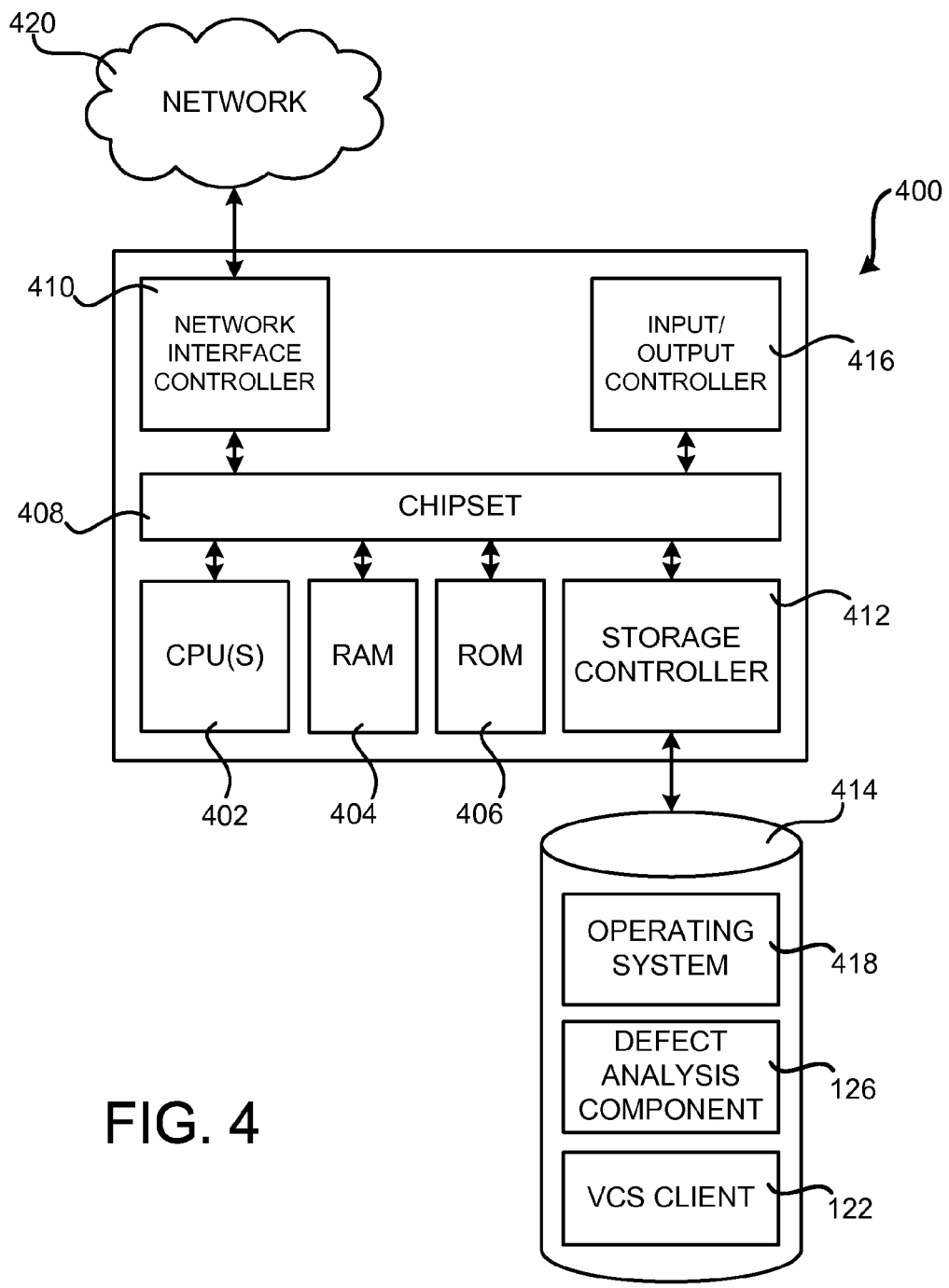
FIG. 4 is a computer architecture diagram showing an illustrative computer hardware architecture for computing devices described in embodiments presented herein.

FIG. 4 shows an example computer architecture for a computer 400 capable of executing the software components described herein. The computer architecture shown in FIG. 4 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 4 might be utilized to implement a computer system 114 in the execution environment for executing the software component 108 or providing other functionality. The computer architecture shown in FIG. 4 might also be utilized to implement computer systems that execute software components for implementing the functionality described above that is provided by the VCS 102, the issue tracking system 110, and/or the defect analysis component 127. A similar architecture as that shown in FIG. 4 might also be utilized to implement the networking devices 118 and the other hardware devices 120 in the execution environment 116. Other types of hardware architectures might also be utilized.

The computer 400 includes a baseboard, or "motherboard," which is a printed circuit board to which a multitude of components or devices may be connected by way of a system bus or other electrical communication paths. In one illustrative embodiment, one or more central processing units ("CPUs") 402 operate in conjunction with a chipset 408. The CPUs 402 are standard programmable processors that perform arithmetic and logical operations necessary for the operation of the computer 400.

The CPUs 402 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 408 provides an interface between the CPUs 402 and the remainder of the components and devices on the baseboard. The chipset 408 may provide an interface to a random access memory ("RAM") 404, used as the main memory in the computer 400. The chipset 408 may further provide an interface to a computer-readable storage medium such as a read-only memory ("ROM") 406 or non-volatile RAM ("NVRAM") for storing basic routines that help to startup the computer 400 and to transfer information between the various components and devices. The ROM 406 or NVRAM may also store other software components necessary for the operation of the computer 400 in accordance with the embodiments described herein.

According to various embodiments, the computer 400 may operate in a networked environment using logical connections to remote computing devices and computer systems through the network 420, such as a local-area network ("LAN"), a wide-area network ("WAN"), the Internet, or any other networking topology known in the art that connects the computer 400 to remote computers. The chipset 408 includes functionality for providing network connectivity through a network interface controller ("NIC") 410, such as a gigabit Ethernet adapter. The NIC 410 is capable of connecting the computer 400 to other computing devices over the network 420. It should be appreciated that any number of NICs 410 may be present in the computer 400, connecting the computer 400 to various types of networks and remote computer systems.

The computer 400 may be connected to a mass storage device 414 that provides non-volatile storage for the computer 400. The mass storage device 414 may store system programs, application programs, other program modules, and data, which are described in greater detail herein. The mass storage device 414 may be connected to the computer 400 through a storage controller 412 connected to the chipset 408. The mass storage device 414 may consist of one or more physical storage units. The storage controller 412 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 400 may store data on the mass storage device 414 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 414 is characterized as primary or secondary storage, and the like. For example, the computer 400 may store information to the mass storage device 414 by issuing instructions through the storage controller 412 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the mass storage device 414 by detecting the physical states or characteristics of one or more particular locations within the physical storage units.

In addition to the mass storage device 414 described above, the computer 400 may have access to other computer-readable storage media to store and retrieve information, such as program modules, data structures, or other data. It should be appreciated by those skilled in the art that computer-readable storage media can be any available non-transitory media that may be accessed by the computer 400. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 414 may store an operating system 418 utilized to control the operation of the computer 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 414 may store other system or application programs and data utilized by the computer 400, such as the defect analysis component 127 and the VCS client 122, each of which was described above in regard to FIGS. 1-3. The mass storage device 414 might also store other programs and data not specifically identified herein.

In one embodiment, the mass storage device 414 or other computer-readable storage media may be encoded with computer-executable instructions that, when loaded into the computer 400, may transform the computer from a general-purpose computing system into a special-purpose computer capable of implementing the embodiments described herein. These computer-executable instructions transform the computer 400 by specifying how the CPUs 402 transition between states, as described above. According to one embodiment, the computer 400 may have access to computer-readable storage media, such as an optical disk, a solid-state storage device, or a magnetic storage device, storing computer-executable instructions that, when executed by the computer 400, perform the routines 200 and 300 described above with regard to FIGS. 2 and 3, respectively.

The computer 400 might also include an input/output controller 416 for receiving and processing input from a number of input devices, such as a keyboard, the mouse, a touchpad, a touch screen, an electronic stylus, or other type of input device. Similarly, the input/output controller 416 may provide output to a display, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that various concepts and technologies for performing a defect analysis for a software component utilizing hardware state data have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus for performing a defect analysis for a software component based upon one or more hardware state changes, the apparatus comprising:
   a processor; and
   a computer-readable storage medium having computer-executable instructions stored thereupon which, when executed by the processor, cause the apparatus to
      obtain hardware state data at different points in time, the hardware state data comprising data that describes the operational state of one or more hardware devices in an execution environment for the software component,
      store the obtained hardware state data in a version control graph maintained by a version control system, utilize the hardware state data stored in the version control graph to perform a defect analysis for an issue with the software component, and utilize the hardware state data stored in the version control graph to restore a configuration of at least one of the one or more hardware devices to a previous point in time based upon results of the defect analysis.

2. The apparatus of claim 1, wherein the hardware state data comprises data defining a physical hardware configuration of a hardware device.

3. The apparatus of claim 1, wherein the hardware state data comprises data defining configuration settings utilized by a hardware device.

4. The apparatus of claim 1, wherein the hardware state data comprises data defining an environmental state of a hardware device.

5. The apparatus of claim 4, wherein the hardware state data indicates that power to the hardware device was lost.

6. The apparatus of claim 4, wherein the hardware state data indicates that a network cable connected to the hardware device was removed.

7. The apparatus of claim 4, wherein the hardware state data indicates that an operator was working on the hardware device.

8. The apparatus of claim 1, wherein at least one of the one or more hardware devices comprises a computer executing the software component.

9. The apparatus of claim 1, wherein at least one of the one or more hardware devices comprises a hardware networking device.

10. The apparatus of claim 1, wherein utilizing the hardware state data stored in the version control graph to perform a defect analysis for an issue with the software component comprises:

utilizing the hardware state data stored in the version control graph to configure one or more hardware devices in a test execution environment; and testing execution of the software component in the test execution environment.

11. A computer-readable storage medium having computer-executable instructions stored thereon which, when executed by a computer, cause the computer to:

collect hardware state data from one or more hardware devices in an execution environment for a software component;

store the collected hardware state data in a version control graph maintained by a version control system;

perform a defect analysis for an issue with the software component utilizing the hardware state data stored in the version control graph by configuring one or more hardware devices in a test execution environment utilizing the hardware state data stored in the version control graph and testing execution of the software component in the test execution environment; and cause one or more actions to be taken based upon results of the defect analysis.

12. The computer-readable storage medium of claim 11, wherein the hardware state data comprises one or more of data defining a physical hardware configuration of a hardware device, data defining configuration settings utilized by a hardware device, or data defining an environmental state of a hardware device.

13. The computer-readable storage medium of claim 11, wherein the hardware state data is collected by a client application executing on one or more of the hardware devices in the execution environment.

14. The computer-readable storage medium of claim 11, wherein the hardware state data is collected by a monitoring system configured to obtain the hardware state data from a management interface exposed by one or more hardware devices in the execution environment.

15. The computer-readable storage medium of claim 11, wherein the hardware state data further comprises timing information, and wherein storing the collected hardware state data in the version control graph maintained by the version control system comprises using the timing information to rewrite data contained in the version control graph.

16. The computer-readable storage medium of claim 11, wherein causing one or more actions to be taken based upon results of the defect analysis comprises:

utilizing the hardware state data stored in the version control graph to restore a configuration of one or more of the hardware devices to a previous point in time based upon results of the defect analysis.

17. The computer-readable storage medium of claim 11, wherein the computer-readable storage medium has further computer-executable instructions stored thereon which, when executed by the computer, cause the computer to:

merge the version control graph storing the collected hardware state data with a version control graph storing changes to the software component to create a merged version control graph; and utilize the merged version control graph to present a unified view of the changes to the software component and the hardware state data.

18. A computer-implemented method for performing a defect analysis on a software component utilizing hardware state data, the method comprising:

storing hardware state data in version control system, the hardware state data being obtained from one or more hardware devices in an execution environment used to execute the software component;

performing a defect analysis for an issue in the software component utilizing the hardware state data stored in the version control system; and causing one or more actions to be taken based upon the defect analysis, the one or more actions comprising utilizing the hardware state data stored in the version control graph to restore a configuration of at least one of the hardware devices in the execution environment to a previous point in time based upon results of the defect analysis.

19. The computer-implemented method of claim 18, wherein storing hardware state data in the version control system comprises:

receiving hardware state data from a hardware device in the execution environment, the hardware state data comprising data that describes an operational state of the hardware device and timing information;

rewriting data stored in the version control system based upon the timing information; and storing the received hardware state data in the version control system.

20. The computer-implemented method of claim 18, wherein the hardware state data comprises one or more of data defining a physical hardware configuration of a hardware device, data defining configuration settings utilized by a hardware device, or data defining a state of an environment in which a hardware device operates.

21. The computer-implemented method of claim 18, wherein the one or more hardware devices in the execution environment comprise one or more of a computer executing the software component or a hardware networking device upon which execution of the software component is dependent.

22. The computer-implemented method of claim 18, wherein performing a defect analysis for an issue in the software component utilizing the hardware state data stored in the version control system comprises:
    restoring a configuration of one or more of the hardware devices to a previous point in time based upon the hardware state data stored in the version control system; and
    testing operation of the software component on the one or more hardware devices having a configuration restored to a previous point in time.

23. The computer-implemented method of claim 18, wherein the hardware state data is collected by a client application executing on one or more of the hardware devices in the execution environment.

24. The computer-implemented method of claim 18, wherein the hardware state data is collected by a monitoring system configured to obtain the hardware state data from a management interface exposed by one or more hardware devices in the execution environment.

\* \* \* \* \*